(12) United States Patent
Baker

(10) Patent No.: US 9,121,389 B2
(45) Date of Patent: Sep. 1, 2015

(54) ENERGY PRODUCING BUILDING STRUCTURES

(71) Applicant: Jess Edward Baker, Roca, NE (US)

(72) Inventor: Jess Edward Baker, Roca, NE (US)

( * ) Notice: Subject to any disclaimer, the term of this patent is extended or adjusted under 35 U.S.C. 154(b) by 0 days.

(21) Appl. No.: 13/625,154

(22) Filed: Sep. 24, 2012

(65) Prior Publication Data

US 2014/0084591 A1    Mar. 27, 2014

(51) Int. Cl.
*F03D 9/00* (2006.01)
*H02P 9/04* (2006.01)
*F03D 11/04* (2006.01)

(52) U.S. Cl.
CPC .............. *F03D 11/04* (2013.01); *F03D 9/002* (2013.01); *F03D 9/007* (2013.01); *F05B 2260/24* (2013.01); *Y02B 10/30* (2013.01); *Y02B 10/70* (2013.01); *Y02E 10/465* (2013.01); *Y02E 10/725* (2013.01)

(58) Field of Classification Search
CPC ......... F03D 11/04; F03D 9/002; F03D 9/007; F03D 9/00; Y02B 10/30; Y02B 10/70; Y02B 10/20; Y02E 10/465; Y02E 10/725; F05B 2260/24
USPC .............. 290/55, 54, 44, 43; 60/398
See application file for complete search history.

(56) References Cited

U.S. PATENT DOCUMENTS

| | | | |
|---|---|---|---|
| 3,823,654 A | 7/1974 | Swaty | |
| 3,832,853 A | 9/1974 | Butler, Jr. | |
| 4,122,675 A | 10/1978 | Polyak | |
| 4,842,048 A | 6/1989 | Higaki | |
| 5,934,990 A | 8/1999 | Steffenino et al. | |
| 7,402,934 B1 | 7/2008 | Gabrys | |
| 7,757,490 B2 | 7/2010 | Kenessey | |
| 8,232,665 B2 | 7/2012 | Sato | |
| 2006/0156725 A1* | 7/2006 | Kenessey | 60/641.12 |
| 2009/0260776 A1 | 10/2009 | Calamaro | |
| 2011/0025064 A1 | 2/2011 | Park | |

FOREIGN PATENT DOCUMENTS

| | | |
|---|---|---|
| FR | 2941517 | 7/2010 |
| FR | 2941517 A1 | 7/2010 |
| FR | 2956427 | 8/2011 |
| FR | 2956427 A1 | 8/2011 |
| GB | 937372 | 9/1963 |
| GB | 937372 A | 9/1963 |
| JP | 7253283 | 10/1995 |
| JP | H07253283 A | 10/1995 |
| JP | 2010242299 | 10/2010 |
| JP | 2010242299 A | 10/2010 |
| KR | 100785400 B1 | 12/2007 |
| KR | 100785400 B1 | 12/2007 |

* cited by examiner

*Primary Examiner* — Javaid Nasri
(74) *Attorney, Agent, or Firm* — John S. Paniaguas; Clark Hill PLC

(57) ABSTRACT

A renewable energy system is disclosed for generating electricity that is self-sustaining. In accordance with an important aspect of the present invention, the system takes advantage of the stack effect to create a natural updraft in at least one vertical air column based on the temperature differences of the air in the vertical air column and the temperature of the ambient air adjacent the exhaust port of the vertical column. A wind generator is located in fluid communication with the vertical air column. Once the updraft is created, the blades of the wind generator rotate which causes electricity to be generated.

16 Claims, 6 Drawing Sheets

ENERGY PRODUCING BUILDING STRUCTURES

BACKGROUND OF THE INVENTION

1. Field of the Invention

The present invention relates to a renewable energy source for building structures and more particularly to building structures that are configured to take advantage of differences of the temperatures of air in a vertical air column and the ambient air to generate electricity based upon the so-called stack effect.

2. Description of the Prior Art

The stack effect is well known and relates to a natural updraft that is created based upon a difference in temperatures between air masses at different elevations. In industrial applications, the byproducts of industrial processes performed in furnaces result in flue gases at relatively high temperatures. These flue gases are known to be vented to the atmosphere by way of a stack. A stack is a relatively tall hollow vertical structure which is open to the atmosphere on an upper end and receives the flue gases on an lower end.

The flue gases can be 1000° F. or more while the temperature of the atmosphere can vary, for example, between −25° F. and 105° F. depending on the location. In such an application, the hot flue gases will be less dense the ambient air. As such, the flue gases will flow naturally toward the atmosphere creating a natural updraft or pressure difference between the bottom of the stack and the top of the stack. The magnitude of the pressure difference is a function of the temperature difference between flue gases and the ambient temperature.

The stack effect is also found in residential structures. For example, many residential structures are known to have supplemental heating units, such as fireplaces and wood burning stoves, which supplement the heat supplied by forced air gas furnaces. These supplemental heating units include a fire box for burning wood or other combustibles and a chimney or stack for venting flue gases resulting from the combustion process to the atmosphere. Since the temperature in the fire box of the supplemental heating unit will always be hotter than the outside ambient temperature when wood is burned in the fire box, a stack effect will be created and the flue gases from the combustion process will be vented to the outside ambient air.

Recent attempts have been made to harness the energy created by the stack effect in order to create a renewable energy source. For example, French Patent Publication No. FR2956427 A1 discloses a "solar chimney". The solar chimney includes a stack this is juxtaposed from the ground level to the top of a high rise building. The solar chimney also includes a "collector" and a wind generator. Two embodiments of the solar chimney are disclosed. In one embodiment, the stack is located outside the building and attached to a façade, In this embodiment, the solar chimney appears to have a metal frame attached to one façade of a high rise building that is covered by a polyester material covered on both sides with polyvinyl chloride. In the alternative embodiment, the solar chimney is located inside the building. In both embodiments, a wind generator is located at the base of the solar chimney for converting wind energy created by the stack effect to electricity. A solar collector, formed as a greenhouse is formed with a diameter of 3-4 kilometers surrounds the solar chimney. The greenhouse is formed at the base of the building with a transparent roof for collecting solar, i.e. heat energy from the sun. As such, the air temperature in the greenhouse will generally be much hotter than the ambient air temperature adjacent the solar chimney on the roof, This difference in temperature will result in a stack effect and cause the hotter air in the greenhouse to rise to the top of the solar chimney. This action, in turn, will cause the blades of the wind generator to spin and generate electricity.

The greenhouse is formed as part of the vestibule of the building and is open to pedestrian traffic. As such, any pedestrians in the greenhouse will be fairly uncomfortable due to the high temperature caused by the greenhouse effect in the greenhouse.

U.S. Pat. No. 4,122,675 discloses a system for a high rise building for implementing the stack effect in order to generate electricity by way of wind generators. In particular air ducts are provided on opposing sides of the building. These air ducts extend from a location spaced above the base of the building and converge at the top of the building in a manifold. A wind generator is located in the manifold, strategically located to receive the air drafts created by the stack effect from both air ducts. Outwardly projecting air inlets in fluid communication with the air ducts are provided at spaced apart vertical locations from the bottom of the air ducts to just below the manifold where the air ducts converge. An air plenum located above the wind generator is provided with opposing horizontal openings for exhausting the air from the air ducts. Such a configuration is used to potentially take advantage of ambient wind currents adjacent the top of the building that can potentially lower the pressure in the air plenum in order to increase the speed of the air flow from ducts and consequently increase the electricity generated by the wind generators.

The configuration of the building disclosed in the '675 patent is not well suited for taking advantage of the stack effect. In particular, the ambient air temperature at the various vertical air intakes may not vary sufficiently to cause a stack effect. However, the structure disclosed in the '675 patent is configured to take advantage of ambient winds in order to cause the blades of the wind generator to rotate.

U.S. Pat. No. 7,757,490 discloses a bio-tower which includes a vertical air duct or chimney extending from ground level to the top of the tower. A lower level glass roof surrounds the bio-tower and provides a covered area for various purposed. An ambient air intake is provided to be in fluid communication with the chimney and is located just below the glass roof. In addition, waste heat from adjacent buildings is channeled so as to be in fluid communication with the chimney. The ambient air intake is provided with a controllable air inlet device, such as a damper or louver, in order to close the air intake when the waste heat is being supplied from the air conditioning units in adjacent buildings. A wind generator is disposed to be in fluid communication with the chimney. An air outlet is provided on top of the chimney.

As stated in the '490 patent, air flow in the chimney is driven by the waste heat from air conditioning systems. The ambient air intake is for capturing wind to further augment the stack effect created by the waste heat from the air conditioning systems from adjacent buildings.

The system disclosed in the '490 patent has several drawbacks. One drawback is the cost of providing the waste heat from adjacent buildings to take advantage of the stack effect. Such an undertaking would be relatively expensive. Additionally, the building implementing the system disclosed in the '490 patent would not be self-contained and would be dependent on the operation of the air conditioning systems in adjacent buildings. The system disclosed in the '490 patent could only likely be implemented if all of the buildings involved are commonly owned and built at the same time.

Thus, there is a need for a renewable energy system that takes advantage of the stack effect to generate electricity that does not suffer from the problems identified with the prior art.

SUMMARY OF THE INVENTION

Briefly, the present invention relates to a renewable energy system for generating electricity that is self-sustaining. In accordance with an important aspect of the present invention, the system takes advantage of the stack effect to create a natural updraft in at least one vertical air column based on the temperature differences of the air in the vertical air column and the temperature of the ambient air adjacent the exhaust port of the vertical column. A wind generator is located in fluid communication with the vertical air column. Once the updraft is created, the blades of the wind generator rotate which causes electricity to be generated.

DESCRIPTION OF THE DRAWING

These and other advantages of the present invention will be readily understood with reference to the following specification and attached drawing wherein.

DETAILED DESCRIPTION

The present invention relates to a renewable energy system for generating electricity that is self-sustaining. In accordance with an important aspect of the present invention, the system takes advantage of the stack effect to create a natural updraft in at least one vertical air column based on the temperature differences at the ambient air intake port and the discharge port of the vertical air column. A wind generator is located in fluid communication with the vertical air column. Once the updraft is created, the blades of the wind generator rotate which causes electricity to be generated.

Figure 5:
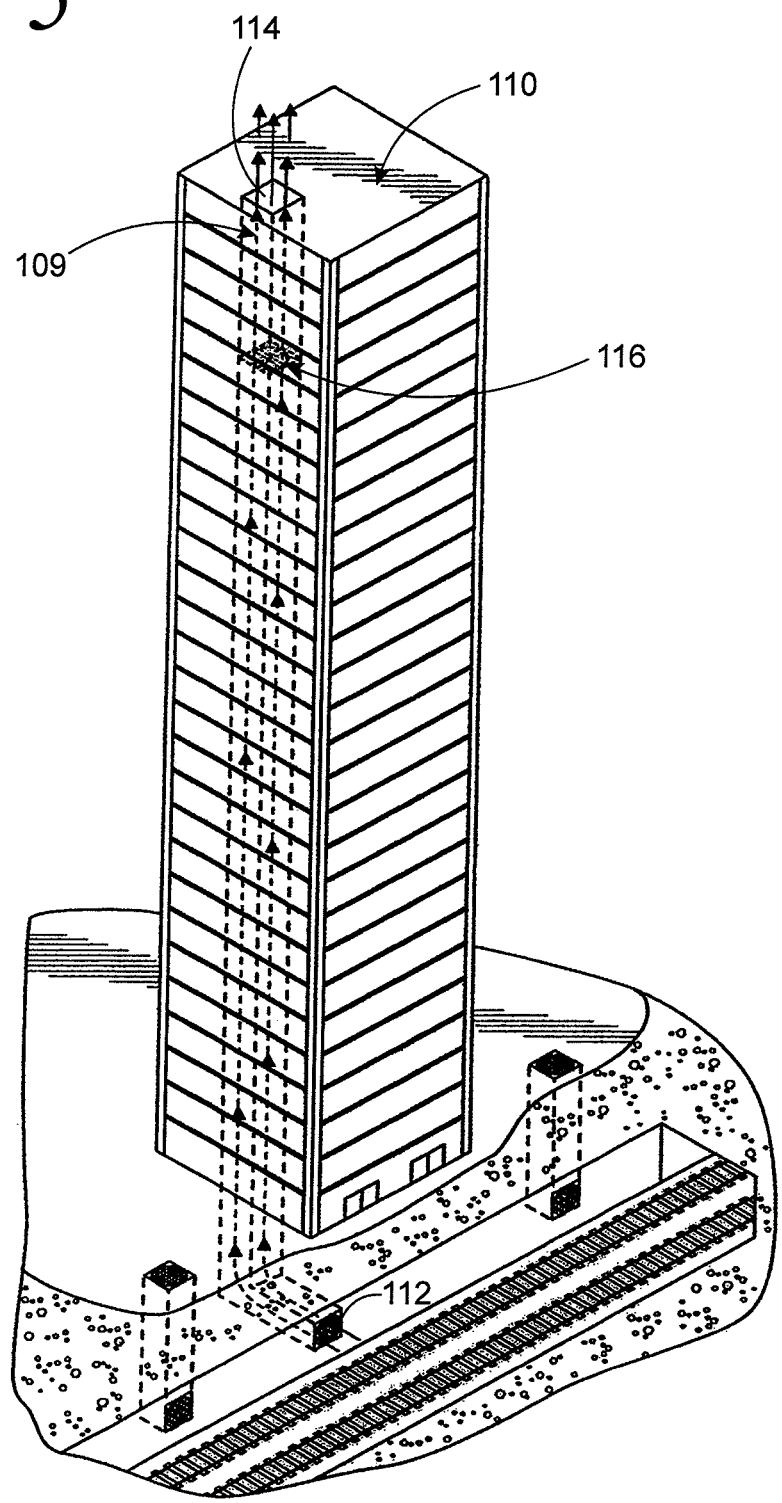
FIG. 5 is an isometric view of yet another alternate embodiment of the invention which illustrates an interior vertical air column in an application which supplements the ventilation of an underground subway system or diesel train station.
Figure 6:
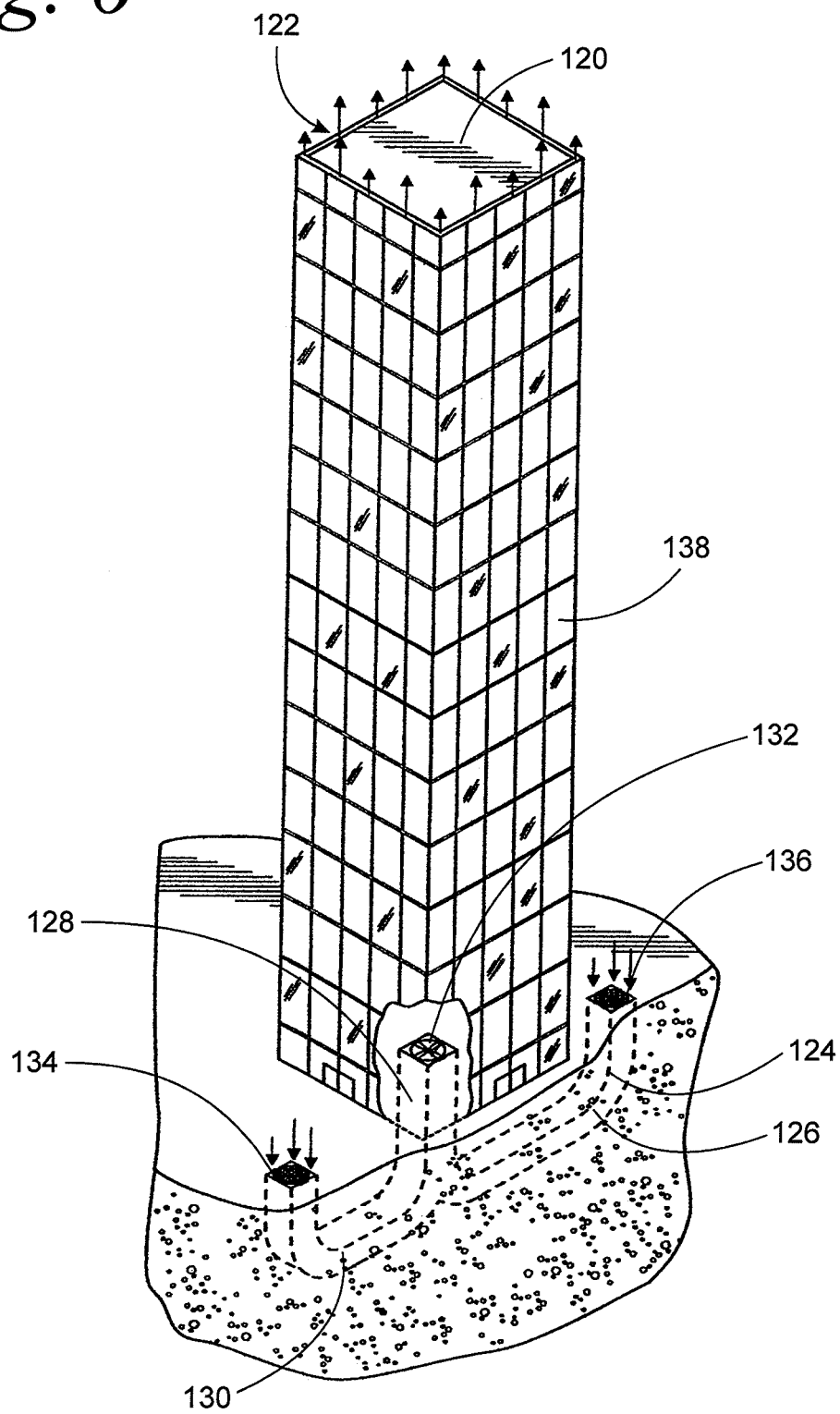
FIG. 6 is another alternate embodiment of the invention in which the vertical air column is formed by insulated glass panels.
Figure 7:
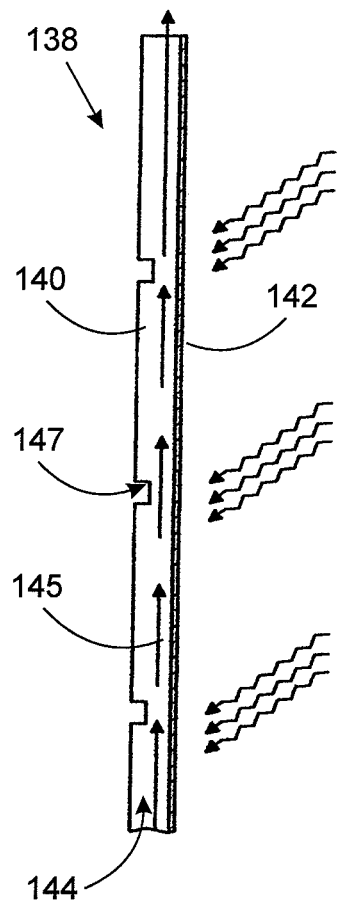
FIG. 7 is a partial side elevational view of an embodiment of an exemplary insulated glass panel that may be used to create a vertical air column.
Figure 8:
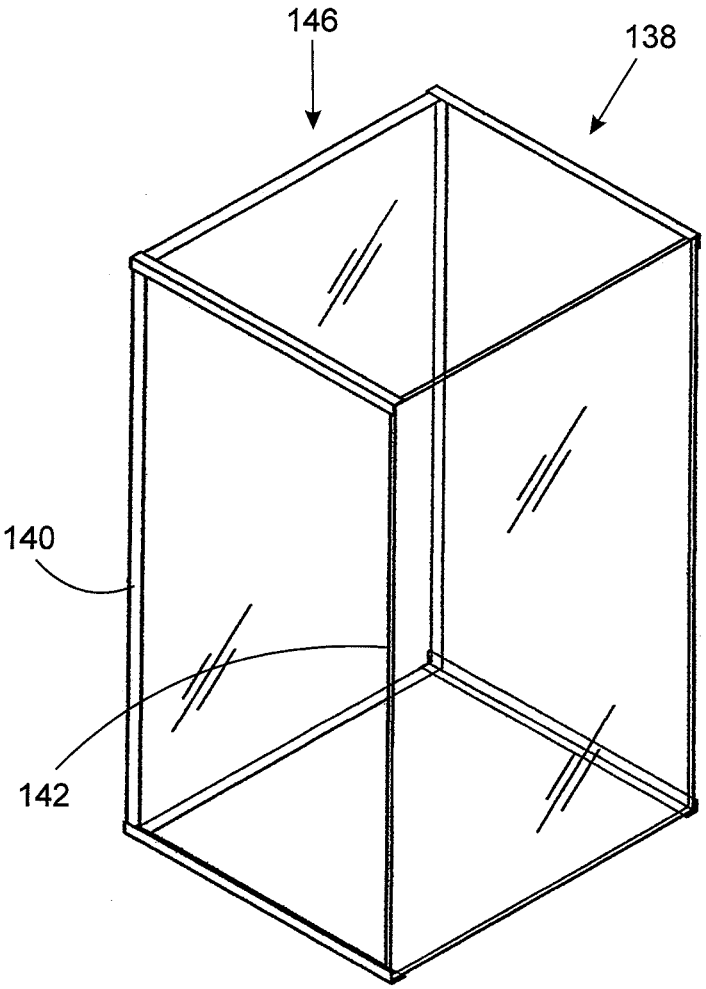
FIG. 8 is an isometric view of another exemplary glass panel that may be used to create a vertical air column.

Multiple embodiments of the invention are contemplated. In one embodiment, one or more hollow air columns are provided. FIGS. 1-4 illustrate embodiments in which the hollow air column is implemented by one or more hollow structural columns located on the exterior of a high rise building. FIG. 2 illustrates an embodiment that can be used to ventilate one or more floors of an underground parking garage. A wind turbine may optionally be included in this embodiment to generate "green" electricity. FIG. 5 is similar to FIGS. 1-4 but illustrates a hollow air column located on the interior of a building that is used to provide natural ventilation in underground train depot. This embodiment may be used with or without a wind generator. FIGS. 6-8 illustrate an alternative embodiment in the vertical air column is provided by way of structural glass panels.

The vertical air columns extend from or adjacent the ground to the roof of the building. One or more air intake ports are provided at grade or below grade level. An exhaust port is provided at the top of the vertical air column. The vertical air columns are constructed to allow the radiant heat energy from the sun to heat the air in the hollow vertical column but not allow any of the heat to escape. As the sun heats the air in the hollow vertical column, a temperature difference develops between the air in the hollow vertical column and the exhaust port. More particularly, the temperature of the air in the hollow vertical column increases due to the radiant heating by the sun and becomes relatively hotter than the temperature of the ambient air adjacent the exhaust port. This temperature difference causes an updraft due to the so called "stack effect".

The updraft is due to the heating of the air which causes the pressure of the air to increase since the pressure of the air is directly proportional to the temperature. As the pressure increases, the heated air seeks the exhaust port which is at atmospheric pressure.

Figure 1:
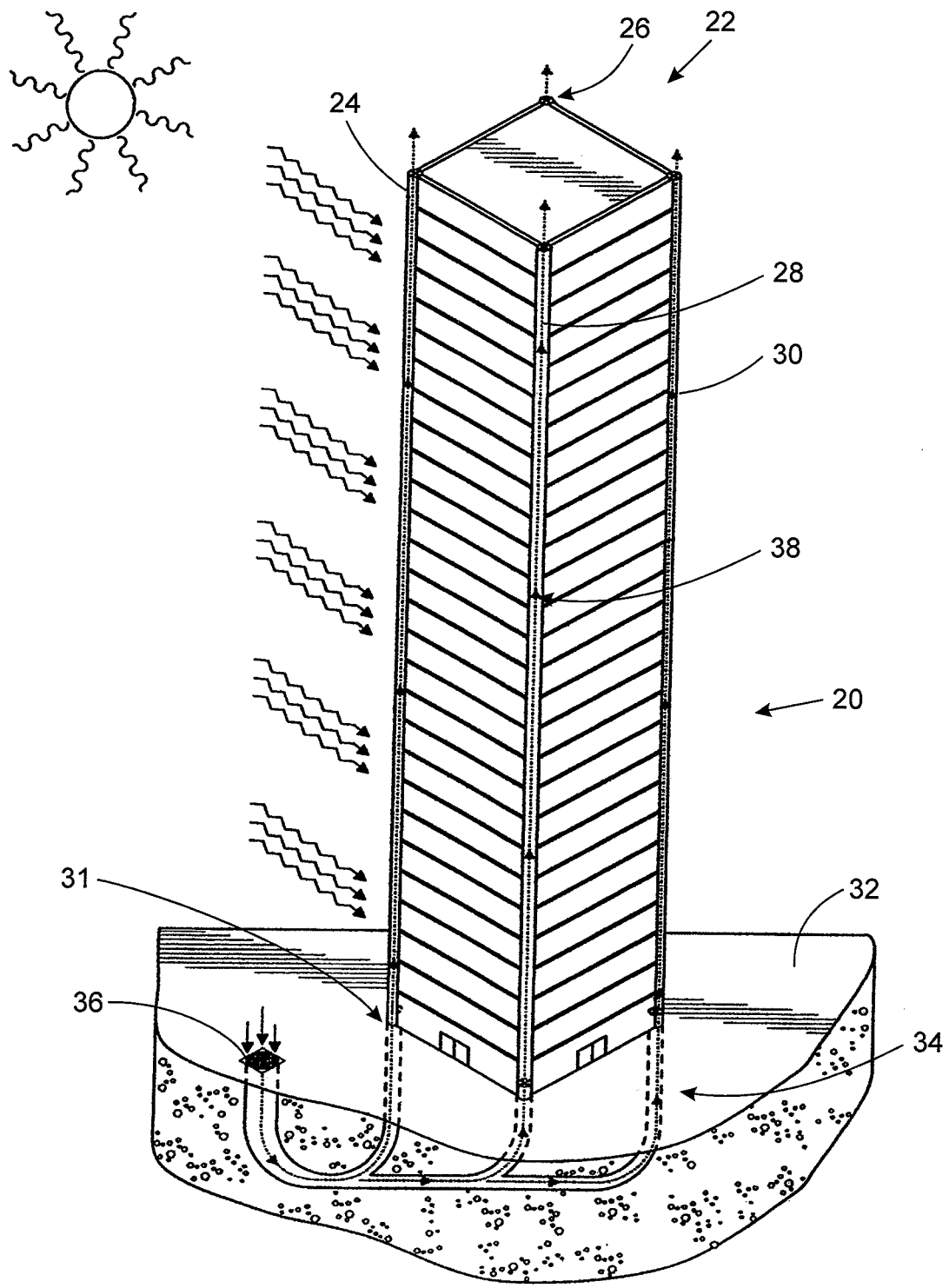
FIG. 1 is an isometric drawing of one embodiment of the invention illustrating the use of hollow vertical columns on a high rise building to create the stack effect illustrating a grade level air intake port and a common manifold connected to all of the hollow vertical columns.
Figure 2:
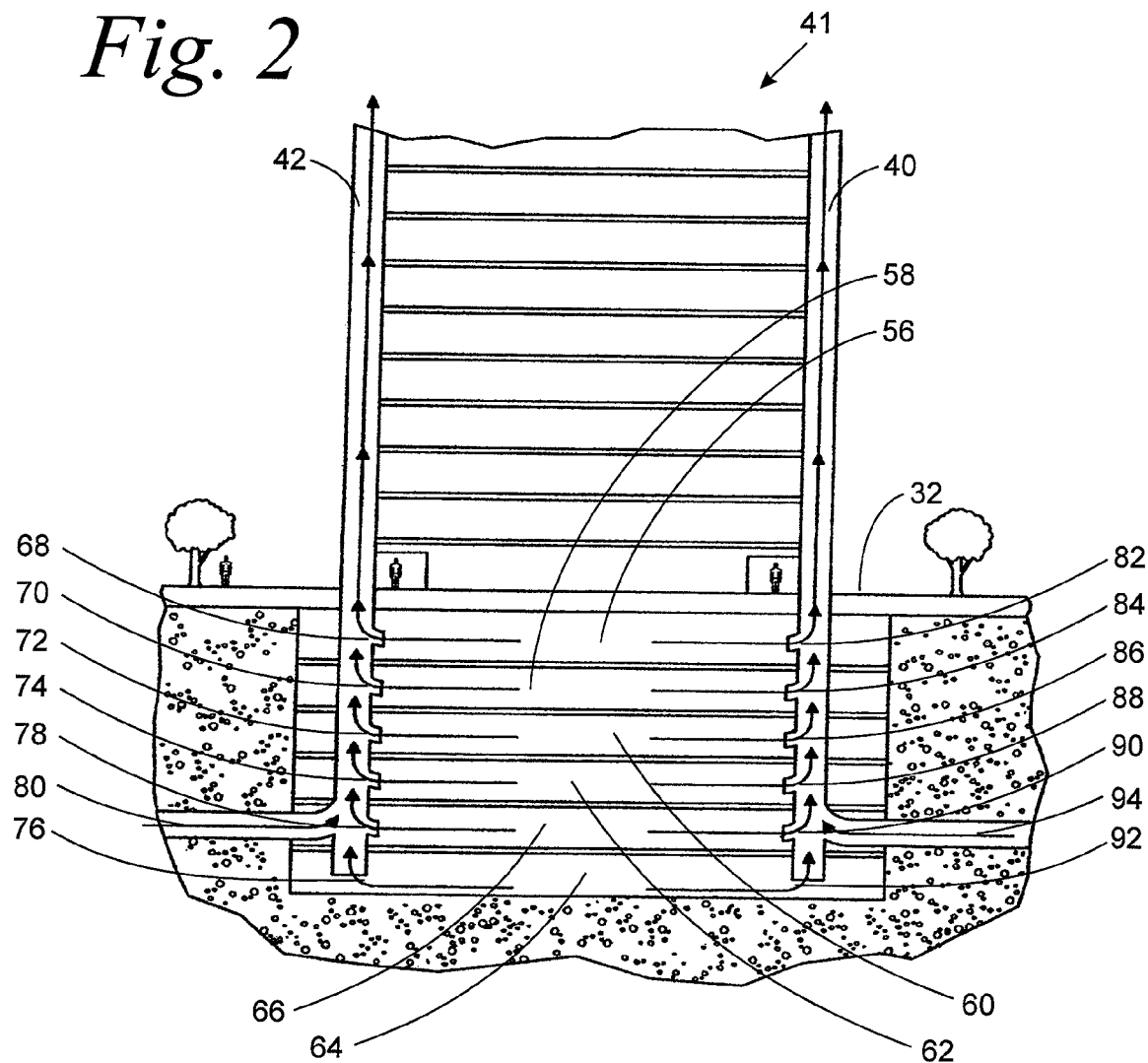
FIG. 2 is an elevational view of an alternate embodiment of the invention illustrating the use of hollow vertical columns on a high rise building to create the stack effect illustrating several sub-grade air intake ports that can be used to provide ventilation in a parking garage.

Referring FIG. 1, an exemplary embodiment of the invention is illustrated, generally identified with the reference numeral 20. A high rise building 22 is shown. Hollow structural vertical columns 24, 26, 28 and 30 are located on the four corners of the building 22. As shown, the hollow structural vertical columns 24, 26, 28 and 30 extend from the ground 32 to the top of the building 22. The hollow structural vertical columns 24, 26, 28 and 30 are open on top defining discharge ports. In this exemplary embodiment, wind generators, generally identified with the reference numeral 31, are disposed adjacent the opposing ends of the vertical columns 24, 26, 28 and 30 in fluid communication therewith. In addition, the opposing ends of the vertical columns 24, 26, 28 and 30 are connected to a common manifold 34. As shown, the manifold 34, in turn, is attached to an intake port 36 at ground level 32.

As mentioned above, the vertical columns 24, 26, 28 and 30 are formed to allow the suns radiant solar rays in but not allow any heat to escape. The vertical columns 24, 26, 28 and 30 may be formed from a transparent material with a one way coating. Such coatings are commonly known and available from many different manufacturers that either limit or allow different types of light to flow through glass. Coatings will be applied to both outer and inner glass panels. As such, the air in the vertical columns 24, 26, 28 and 30 will be heated by the radiant energy of the sun. As the temperature of the air in the vertical columns 24, 26, 28 and 30 increases relative to the ambient air adjacent the exhaust ports, an updraft in the vertical columns 24, 26, 28 and 30 will be created, as indicated by the arrows, generally identified with the reference numeral 38. This updraft causes the wind generators 31 to generate electricity in general while the temperature difference exists.

Figure 3:
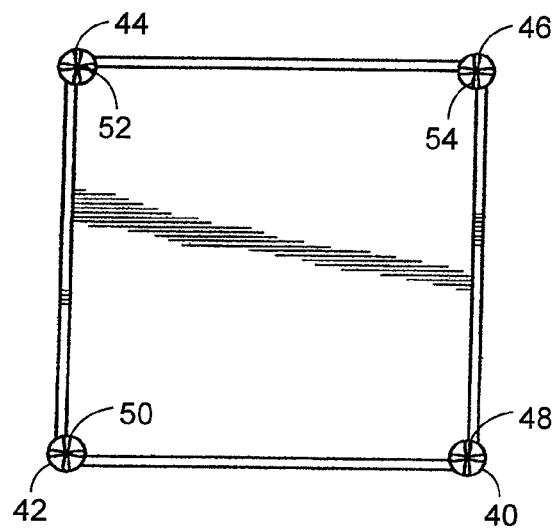
FIG. 3 is a top view of the embodiment illustrated in FIG. 2.

FIGS. 2 and 3 represent an alternate embodiment of the invention. In this embodiment, four hollow structural vertical columns 40, 42, 44 and 46 on the four corners of a building 41 as shown in FIG. 3. FIG. 3 also illustrates a wind generator 48, 50, 52 and 54 in fluid communication with the vertical columns 40, 42, 44 and 46.

This embodiment may be used to provide ventilation in underground spaces, for example underground floors that may be used for a parking garage. Referring to FIG. 2, one or more of the vertical columns 40, 42, 44 and 46 extend below ground level. As shown, the vertical columns 40 and 42 are shown extending down to six floors 56, 58, 60, 62, 64 and 66 below ground 32. Although not shown, the opposing ends of the vertical columns 40, 42, 44 and 46 extend to the roof of the building 41 defining discharge ports (not shown).

With the exception of one floor, for example, the floor 64, each floor 56, 58, 60, 62 and 66 provides at least one air inlet port 68, 70, 72, 74 and 76. These air inlet ports 68, 70, 72, 74 and 76 are provided so as to be in fluid communication with the vertical column 42. The one floor, in this case may be provided with an air inlet port 78 similar to the air inlet ports 68, 70, 72, 74 and 76 as well as an additional air inlet port 80, also in fluid communication with the vertical column 42. As shown, the air inlet ports 68, 70, 72, 74, 76 and 78 are configured to draw air from within the sub-floors six sub-floors 56, 58, 60, 62, 64 and 66. The air intake port 80 is configured to draw air from outside the building 41, for example, a port similar to the port 36 in FIG. 1.

As shown in FIG. 2, the vertical column 40 also extends down to the six floors 56, 58, 60, 62, 64 and 66 below ground 32. Similar to the configuration of the vertical column 42, inlet ports 82, 84, 86, 88, 90 and 92 are provided on each floor 56, 58, 60, 62, 64 and 66. An external inlet port 94 may also be provided as discussed above.

The configuration illustrated in FIGS. 2 and 3 is used to provide air circulation in underground garages. In particular, during the winter and cooler temperature conditions, the air in the lower floors 56, 58, 60, 62, 64 and 66 will be relatively warmer than the temperature of the ambient air adjacent an export port (not shown) on the roof of the building 41. During such conditions, warm air is drawn from the air spaces between the floors 56, 58, 60, 62, 64 and 66 and exhausted up the columns 40, 42 and exhausted to the atmosphere where the ambient air is relatively colder. The air from the air space between floors 56, 58, 60, 62, 64 and 66 is replaced with air drawn from the external sources by way of the external air inlet ports 80 and 94, thus circulating the air in the underground floors by natural convection.

Such a system may be used to supplement forced air ventilation systems for the underground garage. In particular, the natural convection system may be used alone or in conjunction with conventional forced air ventilation equipment during conditions when the ambient air temperature is relatively colder than the air in the air spaces between the floors 56, 58, 60, 62, 64 and 66. During conditions when the ambient temperature is the same or warmer than the air in the air spaces between the floors 56, 58, 60, 62, 64 and 66, the forced air ventilation equipment is used to provide ventilation. Although not shown, wind generators can be incorporated into the vertical columns to generate electricity during natural convection operating conditions.

Figure 4:
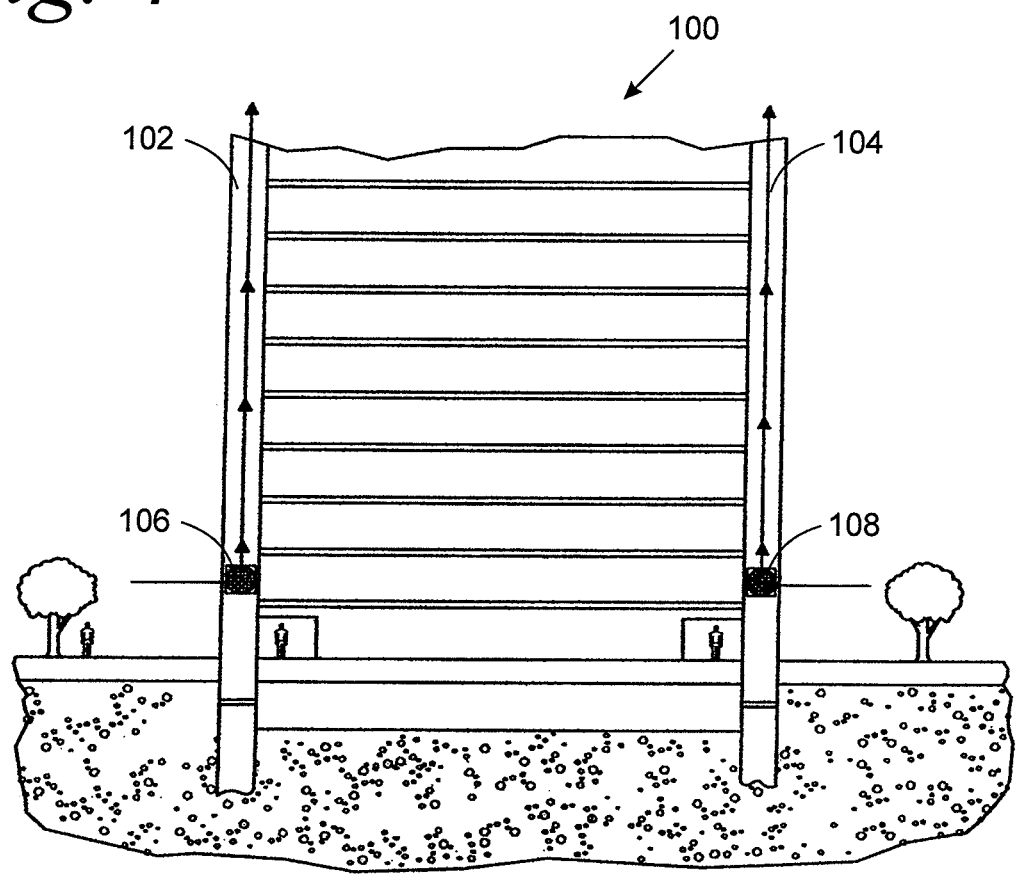
FIG. 4 is a partial elevational view of another alternate embodiment of the invention illustrating the use of hollow vertical columns on a high rise building to create the stack effect illustrating the use of air intake ports formed in the hollow vertical columns.

FIG. 4 illustrates another alternate embodiment. FIG. 4 is a partial elevational view of another alternate embodiment of the invention illustrating the use of hollow vertical columns on a high rise building to create the stack effect illustrating the use of air intake ports formed in the hollow vertical columns. In this embodiment, one or more hollow vertical columns 102, 104 are provided on the corners of a building 100. Two are shown. The columns 102, 104 are hollow structural columns that are anchored in concrete below the base of the building 100. The vertical columns 102,104 extend to an exhaust port (not shown) adjacent the roof (not shown) of the building 100. In this embodiment, an air inlet port 106 and 108 is disposed in each of the vertical columns 102 and 104, respectively. These air inlet ports 106 and 108 are located above the ground level of the building 100, for example at or above tree level, so as to not constitute a safety hazard to pedestrians. Wind generators (not shown) are located at the mouth of the air inlet ports 106 and 108 and covered with grilles. In operation, ambient air enters into the air inlet ports 102, 104. The air in the vertical columns 102,104 is heated by way of radiant energy from the sun. The temperature of the air in the vertical column will rise to a point that its temperature is greater than the temperature of the ambient air at the exhaust port. This temperature difference will cause the air in the vertical columns 102,104 to rise due to the stack effect, which will cause rotation of the blades of the wind generators in order to generate electricity.

FIG. 5 is an isometric view of yet another alternate embodiment of the invention which illustrates an interior vertical air column in an application which supplements the natural ventilation of an underground subway system or diesel train station. In this embodiment, a vertical shaft 109 is provided in the interior of a building 110. The vertical column in this embodiment is configured as vertical shaft 109 that extends down to the level of the underground train station. An air intake port 112 is disposed at the lower level and an air exhaust port 114 is disposed adjacent the roof of the building in order to exhaust air into the atmosphere. A wind generator 116 is disposed in the vertical shaft 109. During conditions, such as during the winter, the air temperature in the lower level will be relatively warmer than the ambient air temperature adjacent the exhaust port 114. During such a condition, an up draft will be created due to the stack effect. This up draft will cause the blades of the wind generator 116 to turn and generate electricity. During conditions in which the temperature difference between the air temperature at the underground level and the temperature of the air adjacent the exhaust port 114, for example in the summer time, the wind generator 116 can be operated in reverse, i.e. as a motor, to turn the blades under the influence of the motor action to ventilate the underground level.

Electrical machines that can function as either a motor or a generator are known in the art. Such machines act as motor when electrical power is applied to them or as a generator when rotational energy is applied to them. An exemplary machine having such characteristic is described in detail in U.S. Pat. No. 7,402,934, hereby incorporated by reference.

FIGS. 6-8 represent an alternate embodiment of the invention. In this embodiment, insulated hollow glass panels are used to create a vertical air column. Referring first to FIG. 6, the glass panels may be located, for example, on one or more corners as well as along entire walls of a building 120. One or more exhaust ports, as indicated by the arrows 122 is located on the roof of the building. The exhaust ports 122 are in fluid communication with a vertical air column, formed by stacked glass panels 138, as discussed below. The glass panels 138 are stacked in columns forming a portion of the facade of the building 120. The glass panels 120, in turn, are configured to be in fluid communication with a manifold 124. The manifold 124 may include three legs 126, 128 and 130. As shown in FIG. 6, the leg 128 may be connected to a vertical column of the glass panels, for example, on a corner of the building 120. A wind generator 132 is connected to an open end of the leg 128. The legs 126 and 130 of the manifold 124 extend to ground level. Air intake ports 134 and 136, covered with grilles provide ambient air to the manifold 124. The ambient air is fed into the vertical air column provided by glass panels 138 that are stacked and form a continuous air column up to the exhaust ports in the roof of the building 120. In this embodiment, the air in the vertical column formed by the glass panels 138 is heated by way of radiation from the sun. As such, the air in the vertical column will be at a relatively higher temperature than the ambient temperature adjacent the exhaust port on the roof of the building 120 causing air to flow upwardly, as indicated by the arrows 145 (FIG. 7) by way of the stack effect. As the air flows upwardly the blades in the wind generator 132 (FIG. 6) thus generating electricity.

Exemplary glass panels are illustrated in FIGS. 7 and 8. The glass panels 138 may be formed from double pane glass defining an inner pane 140 and an outer pane 142. The inner pane may be formed from double pane glass that is argon insulated low E glass with a dark color coating. An exemplary coating for the inner pane 140 is 3M Sun control window film prestige series. The outer pane 142 may be formed from clear glass with a one way coating to allow solar rays in but not allow heat out. An exemplary coating for the outer pane 142 may formed by applying a coating, such as a metal coating, for example, aluminum, to the inside of the outer panel 142, forming a one way mirror. This allows solar rays from the sun to heat the air space between the inner and outer panes 140 and 142, respectively. The glass used for the panes 140 and 142 is a natural heat insulator which traps the heat between the panes 140 and 142.

The panes 140, 142 may be spaced apart greater than 1 inch, for example 12-24 inches. In order to create a vertical air column, the exemplary glass panels 138 may be formed in a generally rectangular shape, as shown in FIG. 8, closed on four sides and open on the top and bottom. As mentioned above, the glass panels 138 are vertically stacked so that the open ends form a continuous vertical air column and at the same time form a portion of the building facade. Aluminum extrusion stand-off brackets may be used to create the rectangular glass panel. As shown in FIG. 7, the inner panel 140 may include notches for securing the glass panels 138 in a vertical direction. The glass panels 138 may be secured in a horizontal direction in various ways. For example, the panels may be applied by attaching the aluminum extrusion stand-off brackets to the existing structure of the building through the use of mechanical fasteners. The base unit will be supported by structural brackets designed to carry the load of the outer panels.

In applications in which a portion of the air column is underground, for example, as illustrated in FIGS. 1, 2, 4, 5 and 6, the underground air column will absorb geothermal heat thus enhancing the air temperature difference. This would be advantageous in cold climates or winter months and provide an unlimited supplemental heat source.

The vertical columns discussed in connection with FIGS. 1-4 form a hollow conduit or tubular element and are formed from a transparent material or formed so as to be at least partially transparent and are coated, for example, with a one-way coating, as discussed above. The columns may be constructed at least in part from transparent PVC (polyvinyl chloride), transparent UHMV (ultra-high molecular weight plastic) or conventional glass panels or other heat insulating material. The columns are designed and sized for the specific requirements and buildable limits of each building. The vertical columns may be integrated into the exterior façade or structure of the building and simply secured to the infrastructure or the facade by conventional methods, such as, product specific mounting brackets and mechanical fasteners and may be attached to an exterior portion of a building either the corners of a building or alternative locations of the facade.

The vertical columns are not load bearing but could be depending on the structural design of the building structure. The vertical columns are primarily used as a conduit to provide a vertical air column. One end of the vertical column is attached or otherwise in fluid communication with at least one input port. An opposing end of the vertical column is attached or otherwise disposed to be in fluid communication with at least one exhaust port.

In applications in which the vertical air column is disposed on an interior portion of the building, load bearing hollow columns may be utilized to provide a vertical air column, for example, as illustrated in FIG. 5. Such vertical air columns may be load bearing. An example of a hollow load bearing column is disclosed in U.S. Pat. No. 7,637,036, hereby incorporated by reference.

Various wind generators are suitable for use with the invention. For example, Honeywell Windtronics Model No. WT 6500 wind generators is suitable in this application. Other wind generators are also suitable. The Honeywell Windtronics Model No. WT 6500 wind generator may need to be modified in size depending on the application. The Honeywell Windtronics Model No. WT 6500 wind generator uses live magnets mounted at the tip of the blades and requires a very low cut in speed of about only 3 mph. As used herein, the wind generator is disposed in the air flow path so that the blades of the generator rotate in response to air flow resulting from the stack effect.

Obviously, many modifications and variations of the present invention are possible in light of the above teachings. Thus, it is to be understood that, within the scope of the appended claims, the invention may be practiced otherwise than as specifically described above.

I claim:

1. A system for creating a renewable energy source for a building, the system comprising:
    a hollow vertical air column configured to be integrated into a building structure in order to take advantage of a natural draft created by a stack effect;
    one or more input ports;
    a manifold which has one or more legs in fluid communication with a lower end of said hollow vertical air column and in fluid communication with said one or more input ports;
    at least one exhaust port located on the roof of a building, said exhaust port configured to be in fluid communication with an opposing end of said hollow vertical air column; and
    a wind generator configured to be disposed in an air flow path of said hollow vertical air column between said one or more input ports and said at least one exhaust port so as to take advantage of the stack effect to generate electricity forming a renewable with respect to said building.

2. The system as recited in claim 1, wherein said hollow air column is integrated into an exterior facade of said building.

3. The system as recited in claim 1, wherein said hollow vertical air column is formed as a hollow conduit.

4. The system as recited in claim 3, wherein said hollow conduit is at least partially Transparent.

5. The system as recited in claim 3, wherein said hollow conduit is coated with a coating to allow solar rays into a cavity formed by said hollow vertical air column.

6. The system as recited in claim 3, wherein said hollow conduit is formed from a heat insulating material.

7. The system as recited in claim 6, wherein said heat insulating material is transparent PVC.

8. The system as recited in claim 6, wherein said heat insulating material is transparent UHMC.

9. The system as recited in claim 6, wherein said heat insulating material is glass.

10. The system as recited in claim 6, wherein said hollow conduit is formed from spaced-apart glass panels.

11. The system as recited in claim 1 wherein said hollow vertical air column is integrated into an interior portion of said building.

12. The system as recited in claim 11 wherein said hollow vertical air column is load bearing.

13. A method for providing a renewable energy source in a building, the method comprising:
(a) incorporating a hollow vertical air column in said building which includes one or more inlet ports in fluid communication with a manifold, said manifold having one or more legs in fluid communication with a lower end of said hollow vertical air column, said manifold also in fluid communication with said one or more input ports, and further including at least one exit port on the roof of said building connected to an opposing end of said hollow vertical air column in a manner to take advantage of a stack effect and cause a natural draft in said air column; and
(b) placing a wind generator in flow communication with said natural draft in said air column between said one or more input ports and said at least one exit port to generate electricity.

14. The method as recited in claim 13, wherein step (a) includes: (a) incorporating said hollow vertical air column with respect to an exterior portion of said building.

15. The method as recited in claim 13, wherein step (a) includes: (a) incorporating said hollow vertical air column with respect to an interior portion of said building.

16. The method as recited in claim 13, wherein step (a) includes: (a) incorporating a portion of said hollow air column underground.

* * * * *